US012603579B2

(12) United States Patent　(10) Patent No.: US 12,603,579 B2
Zirkel et al.　(45) Date of Patent: Apr. 14, 2026

(54) METHOD FOR OPERATING A FLYBACK CONVERTER FOR CHARGING A DC LINK CAPACITOR

(71) Applicant: Robert Bosch GmbH, Stuttgart (DE)

(72) Inventors: Daniel Zirkel, Wiernsheim-Serres (DE); Gholamabas Esteghlal, Stuttgart-Weilimdorf (DE); Markus Klein, Winnenden (DE); Thomas Kiewnick, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/104,413

(22) PCT Filed: Jun. 27, 2023

(86) PCT No.: PCT/EP2023/067456
§ 371 (c)(1),
(2) Date: Feb. 18, 2025

(87) PCT Pub. No.: WO2024/041779
PCT Pub. Date: Feb. 29, 2024

(65) Prior Publication Data
US 2026/0066802 A1　Mar. 5, 2026

(30) Foreign Application Priority Data

Aug. 26, 2022　(DE) ..................... 10 2022 208 842.5

(51) Int. Cl.
*H02M 3/335*　(2006.01)
*H02M 1/00*　(2007.01)
*B60L 15/00*　(2006.01)

(52) U.S. Cl.
CPC ..... *H02M 3/33569* (2013.01); *H02M 1/0025* (2021.05); *B60L 15/007* (2013.01)

(58) Field of Classification Search
CPC .... H02J 9/068; H02J 7/855; H02J 7/96; H02J 2207/20; B60L 3/0092; B60L 2240/547
See application file for complete search history.

(56) References Cited

U.S. PATENT DOCUMENTS 5,325,282 A　6/1994　Bansard
6,087,810 A　7/2000　Yoshida
(Continued)

FOREIGN PATENT DOCUMENTS

DE　102020206987 A1　12/2021

OTHER PUBLICATIONS

Translation of International Search Report for Application No. PCT/EP2023/067456 dated Sep. 27, 2023 (2 pages).

*Primary Examiner* — Daniel Cavallari
(74) *Attorney, Agent, or Firm* — Michael Best & Friedrich LLP

(57) ABSTRACT

A method (100) of operating a flyback converter (250) to charge a DC link capacitor (210), with the steps of: determining (120) a voltage (Ux), characterizing the voltage at the DC link capacitor (210), specifying (140) a target charging current level (I_L) for charging the DC link capacitor (210) and specifying a corresponding duty cycle (Tx) for actuating the first circuit breaker (252) for as long as the determined voltage (Ux) falls below a first voltage level value (U1), specifying (150) a target charging voltage level (U_L), for as long as the determined voltage (Ux) corresponds to the first voltage level (U1) or the determined voltage (Ux) exceeds the first voltage level (U1) and the determined voltage (Ux) falls below a second voltage level (U2).

13 Claims, 4 Drawing Sheets

(56) References Cited

U.S. PATENT DOCUMENTS

| | | | |
|---|---|---|---|
| 7,978,558 B2 | 7/2011 | Kunst | |
| 2009/0001954 A1 | 1/2009 | Morota | |
| 2011/0228570 A1 | 9/2011 | Li et al. | |
| 2025/0202377 A1* | 6/2025 | Greetham | ........... H02M 5/2932 |

* cited by examiner

METHOD FOR OPERATING A FLYBACK CONVERTER FOR CHARGING A DC LINK CAPACITOR

BACKGROUND

The invention relates to a method for operating a flyback converter for charging a DC link capacitor and to the flyback converter for charging the DC link capacitor. Furthermore, the invention relates to a drive train with such a device, a vehicle with a drive train as well as a computer program and a machine-readable storage medium.

Methods and apparatus for charging a DC link capacitor in a high-voltage network are known in the prior art. Preferably, vehicles having an electric drive train comprise a DC link capacitor in a high-voltage network disposed between a power source, preferably a DC voltage and/or a high-voltage power source, and the circuit breakers of a pulse inverter. Preferably, the DC link capacitor is disposed within the pulse inverter on the DC voltage side. The power source, preferably a traction battery, serves to supply electrical energy to an electrical machine. The electrical energy is converted by means of the pulse inverter. The DC voltage of the power source is converted into an alternating voltage for supplying a multi-phase electric machine. When the vehicle is switched off or stopped, the power source is cut off from the high-voltage network by means of at least one switch and the high-voltage network is discharged so that the high-voltage network poses no risk, even when live parts are touched. When the vehicle is put back into service, the power source must be connected to the high-voltage network in a conductive manner. Due to the voltage difference between the discharged high-voltage network and the power source, impermissibly high compensating currents would occur if it were switched on by means of the at least one switch. In order to reduce the voltage differences before the power source is switched on, the DC link capacitor in the high-voltage network is pre-charged or charged to a voltage that corresponds approximately to the voltage of the power source. When the at least one switch is subsequently switched on or closed, there are consequently no significant voltage differences, so that no relevant compensating currents occur. Typically, the DC link capacitor is charged or pre-charged by means of an additional circuit that provides a parallel current path to the at least one switch and also comprises a switch and a resistor, pre-charge resistor or series resistor. For charging, the switch of the parallel current path is closed. The compensating current that forms is limited to permissible levels by means of the resistor. When the charging process is finished, the at least one switch is closed between the high-voltage network and the power source. Then the drive train is ready for use again. The parallel circuit path with switch and pre-charge resistor requires additional components and space and results in additional weight and cost. Thus, there is a need for alternative solutions that allow for charging of the DC link capacitor without the parallel current path. A method for charging a DC link capacitor in a high-voltage network is known from DE 10 2020 206987 A1.

SUMMARY

A method of operating a flyback converter for charging a DC link capacitor is provided. The flyback converter can be connected to a low-voltage network on the input side and to a high-voltage network on the output side. The high-voltage network comprises the DC link capacitor to be charged.

Preferably, the flyback converter is connected during operation to the low-voltage network on the input side and to the high-voltage network on the output side. Preferably, connected or connectable in this context means connected in an electrically conductive or galvanically connected manner, coupled, or wired together. The flyback converter comprises a series circuit on the input side between the input terminals, consisting of a first circuit breaker and a primary winding of a transformer, and of a series circuit of a secondary winding of the transformer on the output side between the output terminals and a first diode connected in the reverse direction. An first capacitor is connected on the output side between the output terminals. Preferably, a second capacitor is connected on the input side between the input terminals. The method comprises the steps of: determining a voltage that characterizes the voltage at the DC link capacitor. specifying a target charging current level for charging the DC link capacitor and specifying a corresponding duty cycle to actuate the first circuit breaker as long as the determined voltage falls below a first voltage level. specifying a target charging voltage level for charging the DC link capacitor and specifying a corresponding duty cycle to actuate the first circuit breaker as long as the determined voltage corresponds to the first voltage level or the determined voltage exceeds the first voltage level and the determined voltage drops below a second voltage level. The first voltage level is less than the second voltage level.

The voltage is determined via a voltage measuring device, which can be disposed inside or outside of the flyback converter, preferably on the output side or on the input side of the flyback converter. The voltage is determined so that the voltage is determined, estimated or calculated using the voltage applied to the DC link capacitor. Preferably, a target charging current level is determined and specified by means of a control device, such that, preferably by means of the control device, preferably by means of a current regulator, a duty cycle for actuating the first circuit breaker is determined and specified as a function of the determined voltage and the specified target charging current level, such that a charging current is set on the output side of the flyback converter to the DC link converter that is approximately or corresponds to the target charging current level. Preferably, a target charging voltage level is determined and specified by means of the control device, such that, preferably by means of the control device, preferably by means of a voltage regulator, a duty cycle for actuating the first circuit breaker is determined and specified as a function of the determined voltage and the specified target charging voltage level, such that a charging voltage approximating or corresponding to the target charging voltage level is set on the output side of the DC link capacitor to be charged.

To charge the DC link capacitor, the flyback converter is operated as a boost converter. Preferably, a lower input voltage, for example an on-board voltage of a vehicle of approximately 12-14 Volts or 48 Volts is continuously boosted, and thus the DC link capacitor is charged until an output voltage corresponding to a power source to be connected to the high-voltage network, for example 200, 400, 800 or even 1000 Volts, is applied to the DC link capacitor. The first circuit breaker on the input side is actuated at a predetermined duty cycle for this purpose. Preferably, the pre-charging or charging of the DC link capacitor to the high voltage to be achieved is to be carried out as quickly as possible. Preferably, to avoid excessive currents and/or voltages at the first circuit breaker, the operation of the flyback converter for charging the DC link capacitor is divided into at least two phases. A current controlled phase is carried out first, followed by a voltage controlled phase. Preferably, in the current controlled phase, the duty cycle for actuating the first circuit breaker is determined according to a specified maximum target charging current level and the first circuit breaker is actuated accordingly. If the determined voltage increases due to the operation of the flyback converter to charge the DC link capacitor via a specifiable first voltage level, for example 90% of the high-volt voltage to be achieved, the current-regulated operation is ended and the voltage-regulated phase is carried out. Preferably, the duty cycle for actuating the first circuit breaker is determined as a function of the determined voltage and the first circuit breaker is actuated accordingly in the voltage-controlled phase according to the predetermined target charging voltage level. If the determined voltage increases due to the operation of the flyback converter for charging the DC link capacitor via a specifiable second voltage level corresponding to the high volt voltage to be achieved, for example, then voltage-regulated operation is ended. Advantageously, a rapid charging of a DC link capacitor is thus enabled while limiting the maximum currents and voltages at the first circuit breaker.

In another embodiment, while specifying the target charging current level, the duty cycle is greater than a first specified duty cycle.

While specifying the target charging current level, the duty cycle is always specified greater than a first specified duty cycle or a minimum duty cycle. This ensures that power flow reversal is reliably avoided. Overcurrents and overvoltages could occur at the first circuit breaker in the case of a power flow reversal. Advantageously, by increasing the duty cycle, possible overloads of the circuit breaker are avoided.

In another embodiment, the target charging current is reduced prior to transitioning from specifying the target charging current level to specifying the target charging voltage level.

The target charging current is reduced, for example to 10% of the predetermined target charging current, before transitioning from the current regulated phase to the voltage regulated phase, for example when 90% of the first voltage level is reached. Advantageously, by means of this measure, large voltage overshoots are avoided when the first voltage level is reached by means of current regulation.

In another embodiment, during the transition from specifying the target charging current level to specifying the target charging voltage level, the duty cycle is continuously adopted.

During the transition from the current-regulated phase to the voltage-regulated phase, the last duty cycle present in the current-regulated phase is adopted and used at the start of the voltage-regulated phase, in particular by initializing the voltage regulator. Initializing the voltage regulator results in a steady transition, preferably avoiding an abrupt change of the steady state operating state. Advantageously, overcurrents and overvoltages are thus avoided at the first circuit breaker.

In another embodiment, the charging current decreases continuously during the specification of the target charging voltage level.

Advantageously, large voltage overshoots are thus avoided when the second voltage level is reached by means of voltage regulation.

In another embodiment, a current characterizing the current through the first diode is determined and the method of operating the flyback converter is ended after the determined current drops below a first specifiable current level, preferably during the step of providing the target charging voltage.

If the current, preferably the output-side current through the current transformer, falls below a first specifiable current level, preferably during the voltage-controlled phase, the method for operating the flyback converter is ended. Advantageously, a termination criterion is provided which safely prevents overcurrents and overvoltages at the first circuit breaker despite possible energy flow reversal.

In another embodiment, the method comprises a further step prior to specifying the target charging current level: actuating the first circuit breaker by a specified first duty cycle for a specifiable amount of time.

In order to ensure non-destructive operation of the flyback converter, an active clamping circuit is preferably provided on the output side of the flyback converter. Preferably, the active clamping circuit comprises a series connection of a third capacitor and a second circuit breaker, wherein the series connection is connected in parallel with the secondary winding of the transformer. By actuating the first circuit breaker by means of a specifiable duty cycle for a specifiable amount of time, the capacity of the active clamping circuit is purposefully recharged. The duty cycle is specified in such a way that excessively high currents and voltages do not occur at the first circuit breaker. Accordingly, the duty cycle is set very low, for example 1 to 10% of the maximum duty cycle set during provision of the target charging current. The duration is set such that the third capacitor is reliably charged. After the third capacitor is charged, the DC link capacitor may be rapidly charged without excess currents and voltages occurring at the first circuit breaker. Advantageously, a method is provided that enables rapid, non-destructive charging of the DC link capacitor despite the active clamping circuit.

In one embodiment, the method comprises a further step prior to providing the target charging current: initializing a current regulator of the flyback converter.

Preferably, initializing the current regulator comprises determining the duty cycle to be specified to actuate the first circuit breaker depending on the determined voltage and the target charging current to be set to charge the DC link capacitor. Advantageously, a method is provided that enables rapid, non-destructive charging of the DC link capacitor.

The invention further relates to a computer program comprising commands which, when the program is executed by a control device, prompt the latter to perform the steps of the method described.

The invention further relates to a computer-readable storage medium comprising commands which, when executed by a control device, prompt the latter to perform the steps of the method described.

Further, the invention relates to a flyback converter for charging a DC link capacitor in a high voltage network. The flyback converter can be connected to a low-voltage network on the input side and to a high-voltage network on the output side. The flyback converter comprises a control device configured to perform a method as described above.

A flyback converter for charging a DC link capacitor in a high-voltage network is provided. The flyback converter comprises a control device configured to perform the described method. For this purpose, the control device preferably comprises configured inputs and outputs that enable the determination of the voltage and or the current, preferably by means of voltage and or current measuring devices, as well as preferably a u controller for current regulation and voltage regulation and for actuating the first circuit breaker.

Advantageously, a flyback converter is provided for rapidly charging a DC link capacitor.

Further, the invention relates to a drive train having a flyback converter as described, and preferably having power electronics and/or an electric drive. Such a drive train is, e.g., used to drive an electrical vehicle. Efficient operation of the drive train is enabled by means of the method and the flyback converter.

The invention further relates to a vehicle having a drivetrain, as described. Advantageously, a vehicle is thus provided which comprises a flyback converter, by means of which rapid charging of the intermediate circuit capacitor is made possible.

It is understood that the features, properties, and advantages of the method according to the invention apply or can be applied accordingly to the device or the drive train and the vehicle and vice versa.

Further features and advantages of embodiments of the invention are apparent from the following description with reference to the accompanying drawings.

BRIEF DESCRIPTION OF THE DRAWINGS

The invention will be explained in further detail hereinafter with reference to the drawings.

DETAILED DESCRIPTION

Figure 1:
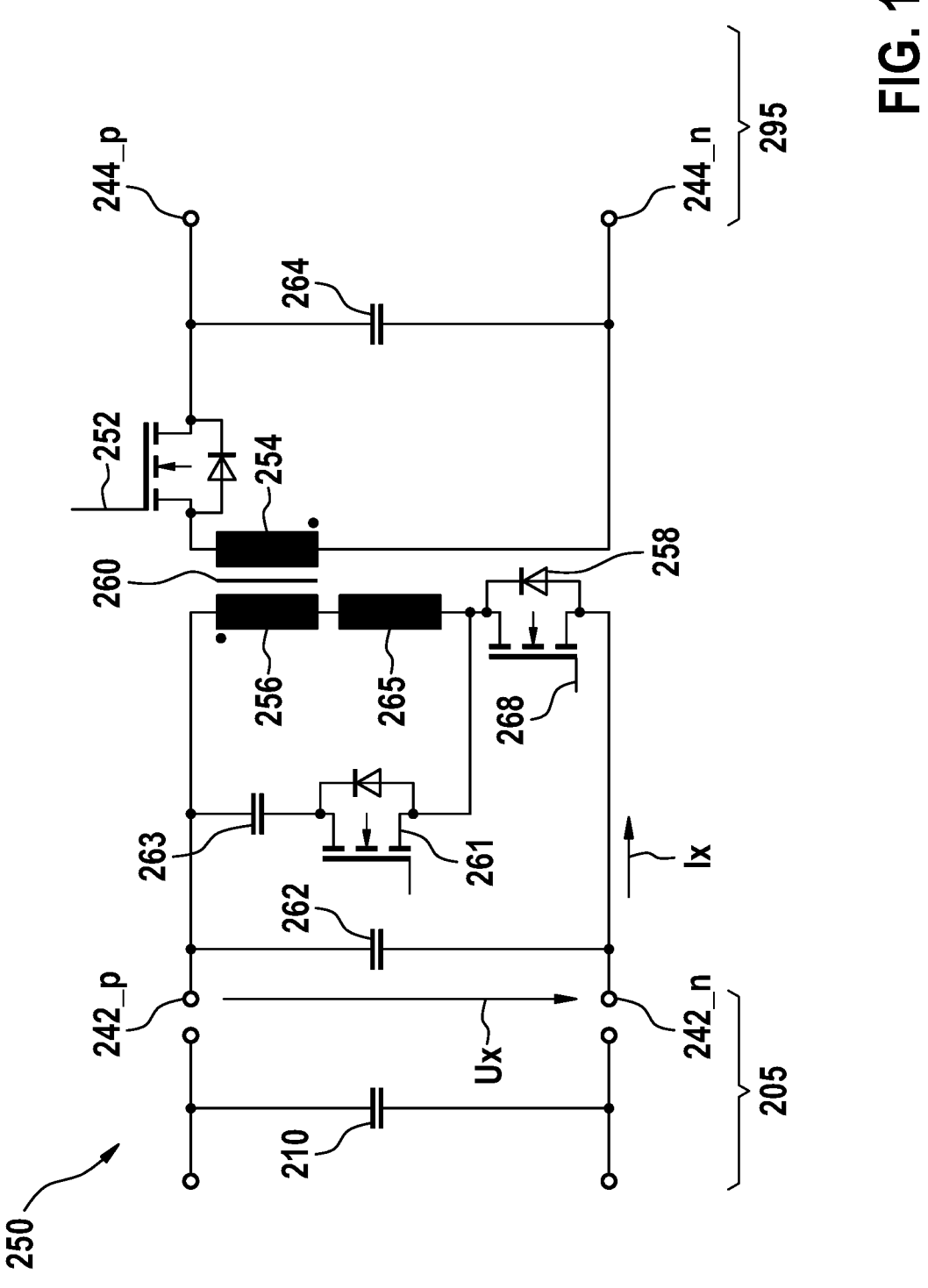
FIG. 1 a first schematic illustration of a flyback converter for charging a DC link capacitor, FIG. 2 a second schematic illustration of a flyback converter for charging a DC link capacitor, FIG. 3 a schematic illustration of a vehicle with a drive train, FIG. 4 a schematic diagram illustrating an exemplary path of voltage and current during the method of charging a DC link capacitor.

FIG. 1 shows a first schematic illustration of a flyback converter 250 or a possible circuit topology for charging a DC link capacitor 210. Preferably, the DC link capacitor 210 is connected to the high voltage network 205 for charging via the output terminals 242_p, 242_n. FIG. 1 is a flyback converter 250 configured to perform a method of operating the flyback converter 250 to charge the DC link capacitor 210 in a high voltage network 205. The flyback converter 250 can be connected, and is preferably connected, to a low-voltage network 295 on the input side and to a high-voltage network 205 on the output side. The high-voltage network 205 comprises the DC link capacitor 210. The flyback converter 250 comprises a series circuit consisting of a first circuit breaker 252 and a primary winding 254 of a transformer 260 on the input side between the input terminals 244_p, 244_n. On the output side, the flyback converter between the output terminals 242_p, 242_n comprises a series connection of a secondary winding 256 of the transformer 260 and a first diode 258 connected in the blocking direction, wherein a first capacitor 262 is connected between the output terminals 242_p, 242_n on the output side. Preferably, the primary winding 254 and the secondary winding 256 of the transformer 260 are wound in opposite directions for primary-side and secondary-side definition of the current direction. Preferably, a second capacitor 264 is connected on the input side between the input terminals 244_p, 244_n, to smooth the voltage between the input terminals, even during reverse operation of the flyback converter. Preferably, the first diode 258 is configured as a body diode of a third circuit breaker 268. Preferably, the flyback converter may transmit electrical energy from the output side to the input side by actuating the third circuit breaker 268. Preferably, the DC voltage of the high voltage network 205 is converted to an alternating voltage by means of the third circuit breaker 268, so that the transformer 260 can transmit it. Preferably, to fully illustrate the circuit topology, the leakage inductance 265 of the transformer 260 is shown between the secondary winding 256 of the transformer 260 and the first diode 258. Preferably, the flyback converter 250 comprises an active clamping circuit, or snubber circuit, configured as a series connection of a third capacitor 263 and a second circuit breaker 261. The series connection of the active clamping circuit is connected in parallel to the secondary winding 256 of the transformer 260, preferably in parallel to the secondary winding 256 and the leakage inductance 265. The active clamping circuit reduces voltage spikes due to the leakage inductance 265 across the primary winding 254 of the transformer 260 via the third capacitor 263. A voltage, preferably the voltage Ux, which by way of example characterizes the voltage at a connected DC link capacitor 210, drops between the output terminals 242_p, 242_n. To charge the DC link capacitor 210, a current Ix flows through the flyback converter 250 and into the capacitor via output terminals 242_p, 242_n.

Figure 2:
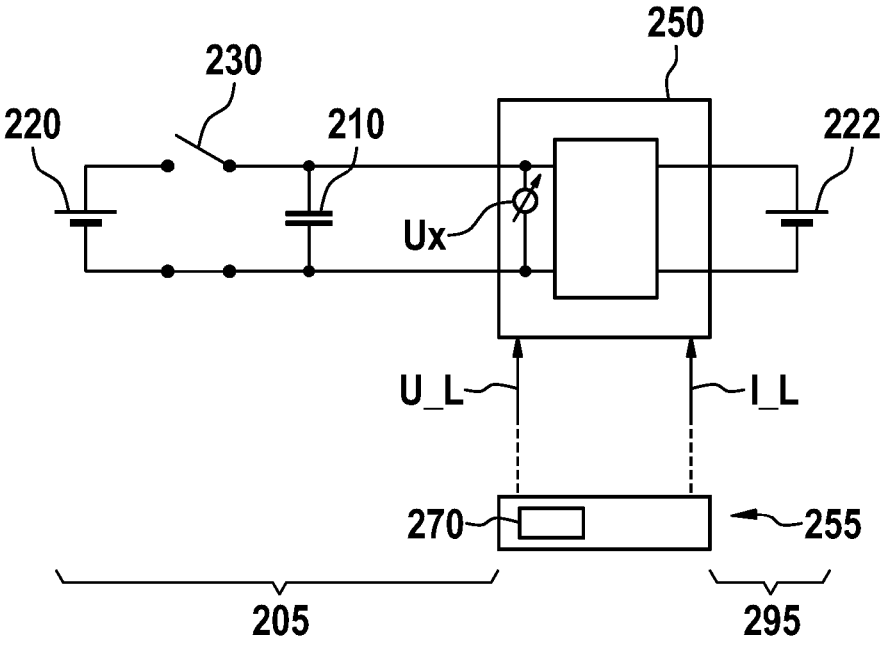

FIG. 2 shows a second schematic illustration of a flyback converter 250 for charging a DC link capacitor 210. The high voltage network 205 can be connected to a power source 220 by way of at least one switch 230. The high-voltage network 205 is coupled to a low-voltage network 295 by way of the DC-DC converter or flyback converter 250. The flyback converter 250 comprises an inductive coupling or a transformer, and thus galvanically separates the high-voltage network 205 from the low-voltage network 295. Preferably, the low-voltage network 295 is supplied with electrical power from the high-voltage network 205. Preferably, the flyback converter 250 is actuated reversely for this purpose and in the buck converter operating mode. Preferably, the low-voltage power system 295 comprises a low-voltage power source 222, for example a battery or accumulator, and other devices (not shown), for example control devices. One control device 255 is designed and/or arranged to determine a voltage Ux, to specify a target charging current level I_L, to specify a corresponding duty cycle Tx, and to specify a target charging voltage level U_L. Preferably, the control device 255 comprises a current regulator 270 or a voltage regulator to determine the corresponding duty cycle as a function of the target charging current level or the target charging voltage level. In this illustration, the control device 255 and the current regulator 270 are shown outside of the flyback converter 250, wherein the control device 255 and the current regulator 270 may also be disposed within the flyback converter 250.

Figure 3:
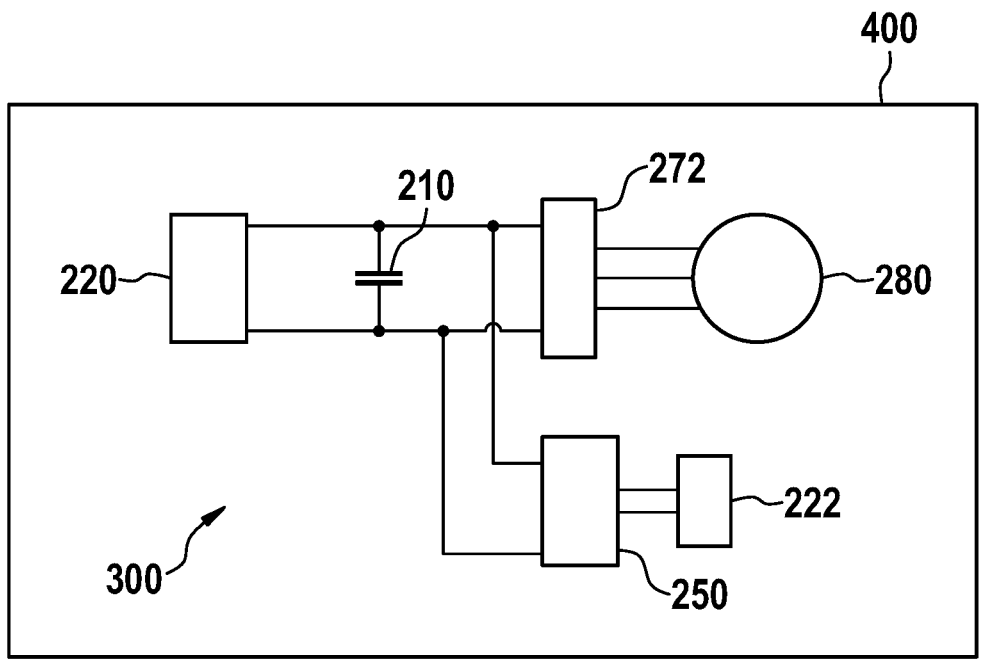

FIG. 3 shows a schematic illustration of a vehicle 400 comprising a drive train 300. The illustration shows, by way of example, a vehicle 400 that is equally capable of being used on land, on water, and in the air. The drive train 300 comprises the flyback converter 250, preferably power electronics, a pulse inverter 272. Preferably, the drive train further comprises a power source 220, the DC link capacitor 210, an electric machine 280, and/or a low-voltage power source 222. The pulse inverter 272 is preferably used to supply electrical power to the electrical machine 280 from the power source 220. Preferably, the pulse inverter 272 comprises the DC link capacitor 210 such that, during operation, the flyback converter 250 is connected to that of the pulse inverter 272.

Figure 4:
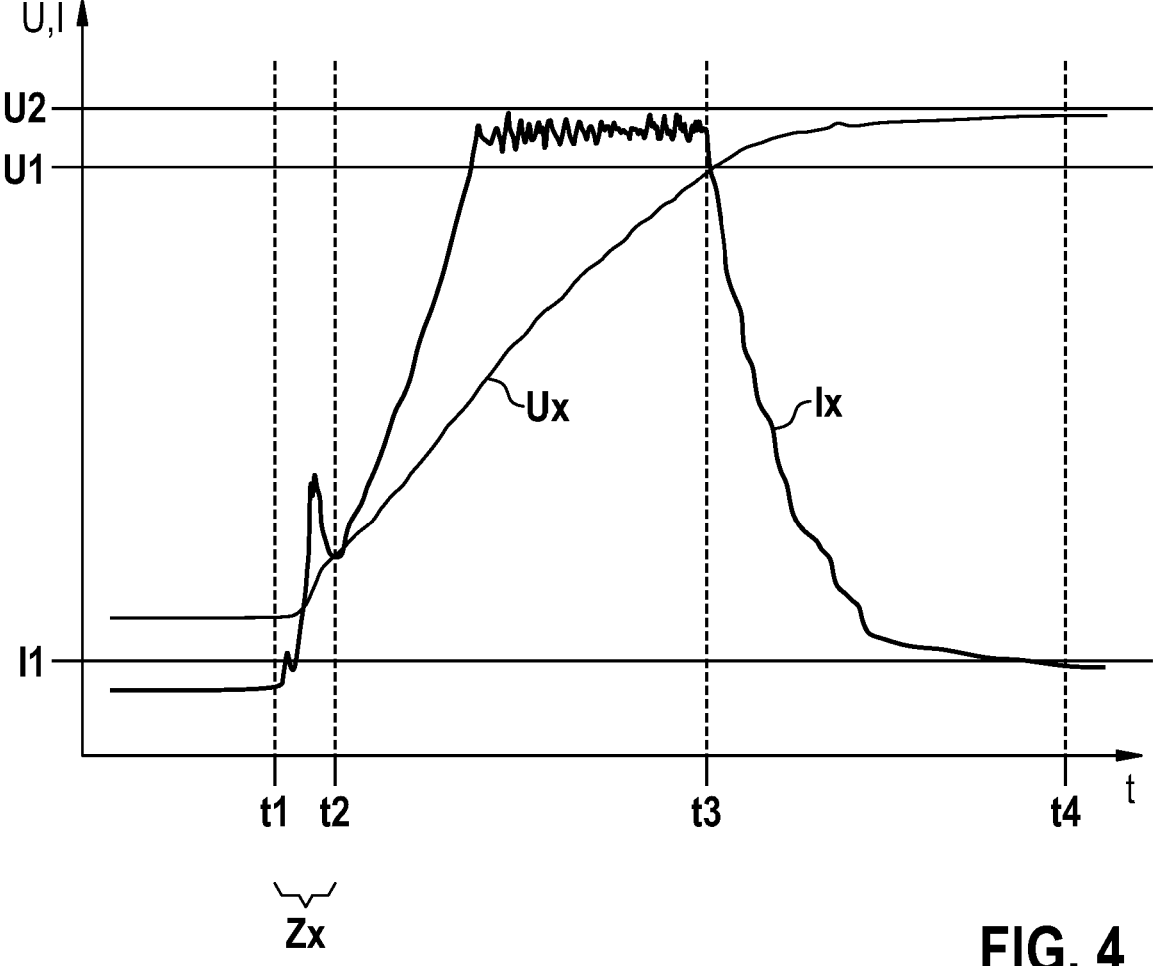

FIG. 4 shows a schematic diagram with example voltage sequences during operation of a flyback converter 250 for charging a DC link capacitor 210. The voltage U on the output terminals of the flyback converter 250 or on the DC link capacitor 210 and the current I through the flyback converter 250 or in the DC link capacitor 210 is shown on the diagram on the y-axis above the time t on the x-axis. Before the start of the method, a low voltage Ux is present on the output terminals. The DC link capacitor is not yet charged. Also, no significant current Ix flows through the flyback converter 250 or the DC link capacitor 210. At time t1, the control device 255 receives the signal for charging the DC link capacitor 210. Preferably, the control device 255 controls the first circuit breaker 252 by means of a specifiable first duty cycle T1 for a specifiable time period Zx up to time t2 for pre-charging the third capacitor 263 of the active clamping circuit. During this period, the charging current Ix and the voltage Ux increase slightly. The control device then provides a target charging current level I_L for charging the DC link capacitor 210 by specifying a duty cycle Tx to actuate the first circuit breaker 252 as long as the determined voltage Ux falls below a first voltage level U1. The charging current Ix rapidly increases by means of the current regulation to the level of the specified target charging current level I_L, and the voltage Ux on the output terminals increases accordingly. At time t3, the control device provides a target charging voltage level U_L as long as the determined voltage Ux corresponds to the first voltage level U1 or the determined voltage Ux exceeds the first voltage level U1 and the determined voltage Ux drops below a second voltage level U2. When the determined voltage Ux reaches the second voltage level U2, the DC link capacitor is recharged and the time t4 results. By means of the voltage regulation, the voltage Ux increases further in the period between t3 and t4 until it reaches the level of the specified target charging voltage. Accordingly, the charging current Ix drops again. Preferably, the method 100 for operating the flyback converter 250 is ended after the determined current Ix drops below a first pre-determinable current level I1.

Figure 5:
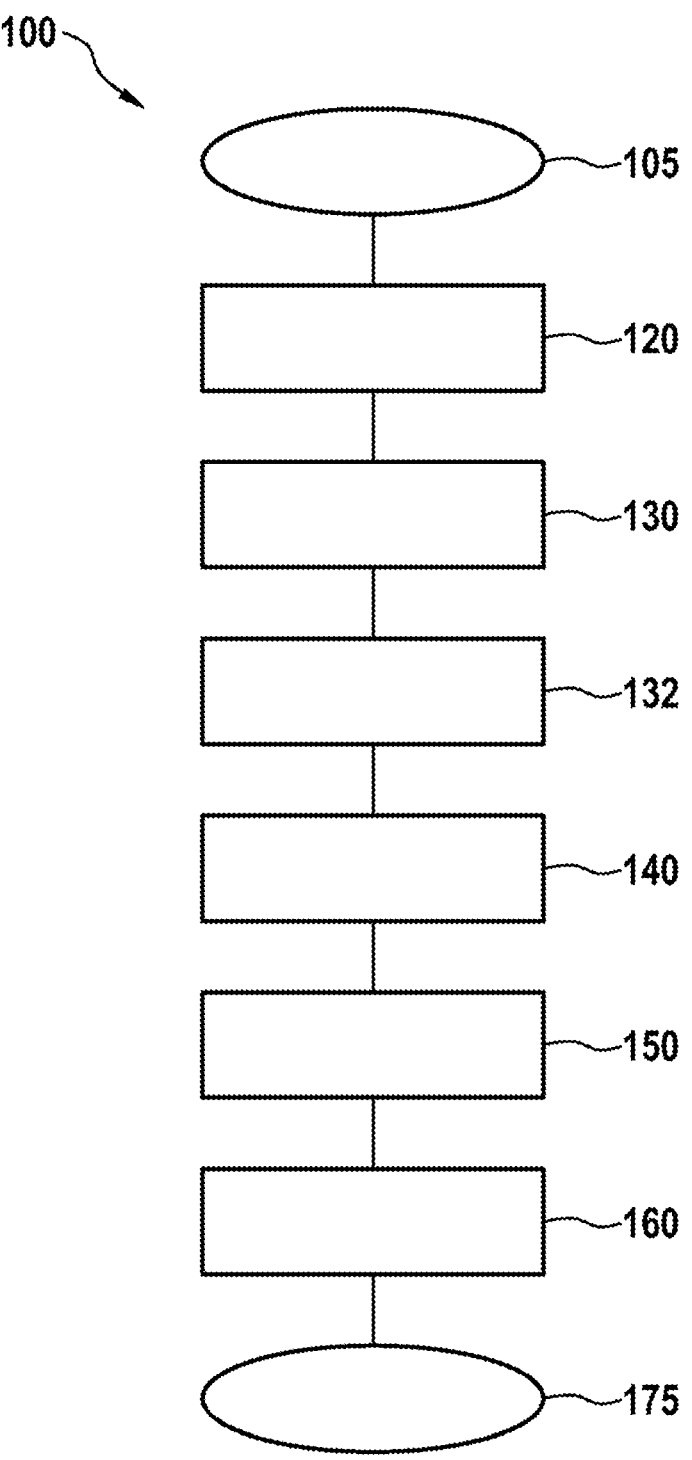
FIG. 5 a schematic flow chart for a method for charging a DC link capacitor.

FIG. 5 shows a schematic flowchart for a method 100 of operating a flyback converter 250 to charge a DC link capacitor 210. The method begins with step 105. In step 120, a voltage Ux is determined that characterizes the voltage at the DC link capacitor 210. Preferably, in step 130, the first circuit breaker 252 is actuated by a specifiable first duty cycle T1 for a specifiable amount of time Zx. Preferably, in step 132, a current regulator 270 of the flyback converter 250 is initialized. In step 140, a target charging current level I_L is specified for charging the DC link capacitor 210 and a duty cycle Tx to actuate the first circuit breaker 252 as long as the determined voltage Ux drops below a first voltage level U1. In step 150, a target charging voltage level U_L is specified as long as the determined voltage Ux corresponds to the first voltage level U1 or the determined voltage Ux exceeds the first voltage level U1 and the determined voltage Ux drops below a second voltage level U2. Preferably, in step 160, a current Ix is determined that characterizes the current through the first diode 258, wherein the method 100 for operating a flyback converter 250 is ended after the determined current Ix drops below a first specifiable current level I1. The method ends at step 175.

The invention claimed is:

1. A method (100) for operating a flyback converter (250) for charging a DC link capacitor (210), wherein the flyback converter (250) is connectable to a low-voltage network (295) on the input side and to a high-voltage network (205) on the output side, wherein the high-voltage network (205) comprises the DC link capacitor (210), wherein the flyback converter (250) comprises a series circuit consisting of a first circuit breaker (252) and a primary winding (254) of a transformer (260) between the input terminals (244_p, 244_n) on the input side, and comprises a series connection of a secondary winding (256) of the transformer (260) and a first diode (258) connected in the blocking direction between the output terminals (242_p, 242_n) on the output side, wherein a first capacitor (262) is connected between the output terminals (242_p, 242_n) on the output side, the method comprising:

determining (120) a voltage (Ux) characterizing the voltage at the DC link capacitor (210), specifying (140) a target charging current level (I_L) for charging the DC link capacitor (210) and specifying a corresponding duty cycle (Tx) for actuating the first circuit breaker (252) for as long as the determined voltage (Ux) falls below a first voltage level (U1), and specifying (150) a target charging voltage level (U_L) for charging the DC link capacitor (210) and specifying a corresponding duty cycle (Tx) for actuating the first circuit breaker (252) for as long as the determined voltage (Ux) corresponds to the first voltage level (U1) or the determined voltage (Ux) exceeds the first voltage level (U1) and the determined voltage (Ux) falls below a second voltage level (U2), wherein the first voltage level (U1) is less than the second voltage level (U2).

2. The method according to claim 1, wherein the duty cycle (Tx) is greater than a predetermined first duty cycle (T1) during the specification (140) of the target charging current level (I_L).

3. The method according to claim 1, wherein the target charging current (I_L) is reduced prior to transitioning from specifying (140) the target charging current level (I_L) to specifying the target charging voltage (U_L).

4. The method according to claim 1, wherein the duty cycle (Tx) is continuously adopted during the transition from specifying (140) the target charging current level (I_L) to specifying the target charging voltage level (U_L).

5. The method according to claim 1, wherein the charging current (Ix) decreases continuously during the specification (150) of the target charging voltage level (U_L).

6. The method of claim 1, with the step of:

determining (160) a current (Ix) characterizing the current through the first diode (258), wherein the method (100) for operating a flyback converter (250) is ended after the determined current (Ix) drops below a first specifiable current level (I1).

7. The method according to claim 1, with the step prior to specification (140) of the target charging current level (I_L): actuating (130) the first circuit breaker (252) by a predetermined first duty cycle (T1) for a predetermined length of time (Zx).

8. The method according to claim 1, with the step prior to specification (140) of the target charging current level (I_L): initializing (132) a current regulator (270) of the flyback converter (250).

9. A computer program comprising commands which, when the program is executed by a control device (255), prompt the latter to perform the method/the steps of the method (100) according to claim 1.

10. A computer-readable storage medium comprising commands which, when executed by a control device (255), prompt the latter to perform the method/the steps of the method (100) according to claim 1.

11. A flyback converter (250) for charging a DC link capacitor (210) in a high-voltage network (205), wherein the flyback converter (250) is coupled to a low-voltage network (295) on the input side and to a high-voltage network (205) on the output side, wherein the flyback converter (250) comprises a control device (255) and is configured to perform a method according to claim 1.

12. A drive train (300) having a flyback converter (250) according to claim 11.

13. A vehicle (400) having a drive train (300) according to claim 12.

\* \* \* \* \*